Figure 1:
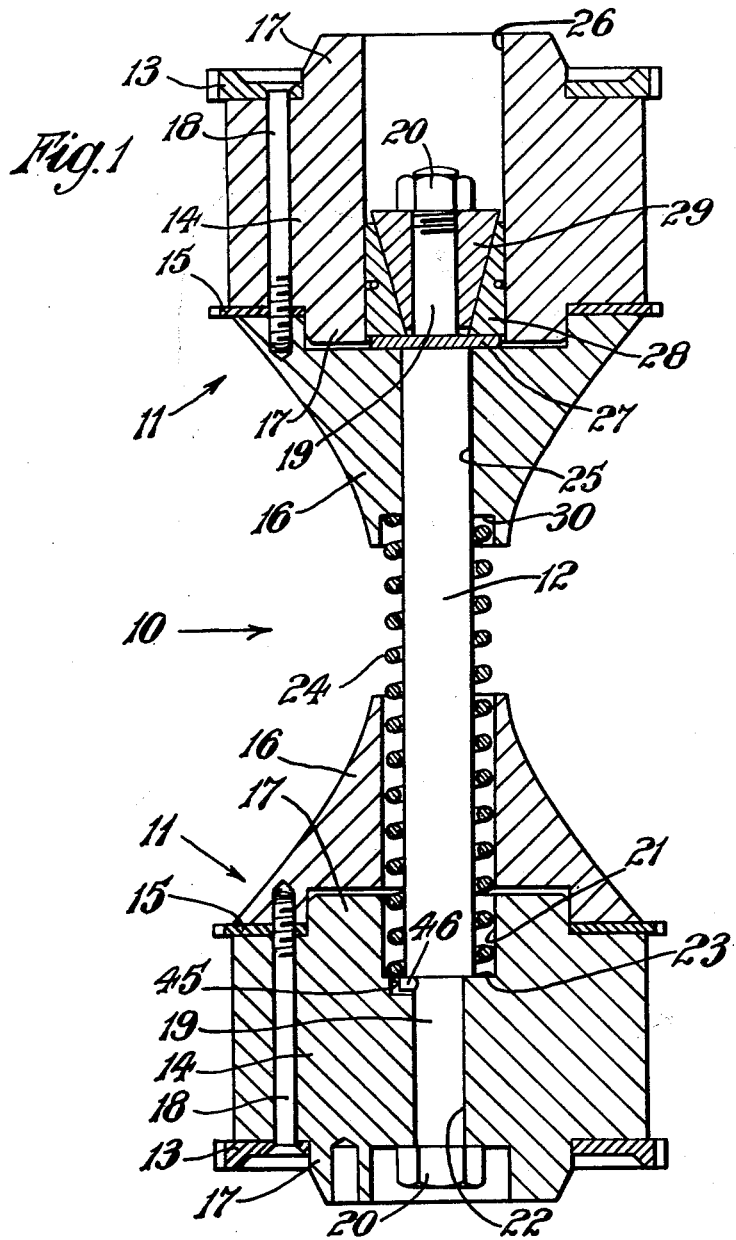

June 1, 1965 H. A. ILES 3,186,885
METHOD AND APPARATUS FOR MAKING A RESILIENT ROLLING LOBE
DIAPHRAGM OF CORD AND ELASTOMERIC MATERIAL
Filed Jan. 17, 1961 6 Sheets-Sheet 2

INVENTOR
Harold Arthur Iles
by Benj. T. Rauber
his attorney

June 1, 1965　　　　　　　H. A. ILES　　　　　　3,186,885
METHOD AND APPARATUS FOR MAKING A RESILIENT ROLLING LOBE
DIAPHRAGM OF CORD AND ELASTOMERIC MATERIAL
Filed Jan. 17, 1961　　　　　　　　　　　　　　6 Sheets-Sheet 3

INVENTOR
Harold Arthur Iles
by Benj. T. Cauber
his attorney

United States Patent Office 3,186,885
Patented June 1, 1965

3,186,885
METHOD AND APPARATUS FOR MAKING A RESILIENT ROLLING LOBE DIAPHRAGM OF CORD AND ELASTOMERIC MATERIAL
Harold Arthur Iles, Tyseley, Birmingham, England, assignor to Dunlop Rubber Company Limited, a British company
Filed Jan. 17, 1961, Ser. No. 83,279
15 Claims. (Cl. 156—132)

This invention relates to a method of manufacture of a resilient diaphragm of the rolling lobe type and to a carcass therefor.

It is known to manufacture resilient diaphragms by superimposing two or more plies of rubberised "weftless" or "weak weft" cord fabric cut on the bias on a cylindrical building drum and subsequently forming the cylindrical tube of fabric to the desired shape before applying rubber and moulding and curing.

In such a diaphragm separation of the cords to varying degrees, according to the method used, is inevitable. Furthermore imperfect separation of the cords by different amounts is usually present in a single diaphragm.

The object of the present invention is to provide an improved method and apparatus for manufacturing a resilient diaphragm.

According to the present invention a method of manufacturing a resilient diaphragm comprises winding a cord of textile material alternately over peripheral edges of two end portions of a forming spool, said cord forming a substantially cylindrical sock between the end portions, twisting said end portions relative to each other through a predetermined angle and allowing them to approach closer to each other during twisting to produce a neck in the sock and treating said sock to enable it to retain a twisted condition on removal from said forming spool.

According also to the present invention a method of manufacturing a resilient diaphragm comprises winding a cord of textile material alternately over peripheral edges of two end portions of a forming spool, said cord forming a substantially cylindrical sock between the end portions, twisting said end portions relative to each other through a predetermined angle and allowing them to approach closer to each other during twisting and by this means producing a neck or hourglass shape in the sock, the smallest diameter of said neck occurring midway between said end portions, treating said sock to enable it to retain a twisted condition on removal from said forming spool and turning it back on itself so that the free ends lie together, applying plies of elastomeric material to at least one side thereof, and finally moulding and curing the sock.

Preferably the textile material comprises filamentary synthetic material such as nylon, rayon, or polyethylene terephthalate and the treating of the sock may be done by dipping the sock into latex or rubber solution or by applying plies of elastomeric material to it. The elastomeric material is preferably natural rubber in the uncured or semi-cured state.

According also to the invention, apparatus for manufacturing a flexible diaphragm comprises a forming spool having a pair of co-axial end portions spaced axially apart and movable axially and angularly relative to each other, retaining means associated with the peripheral edges of said end portions for retaining cords of textile material wound over said retaining means and means whereby a sock of cords formed by winding cord over alternate retaining means of the end portions may be given a neck shape intermediate said retaining means.

Preferably the end portions are surfaces of revolution and are mounted on a cylindrical rod passing axially and centrally through both and are spring-loaded apart. Each end portion comprises a circular end plate, a cylindrical member, a circular separator plate and a substantially frusto-conically shaped member tapering radially inwardly from said separator plate, all mounted co-axially of each other without relative movement therebetween. The end portions are disposed so that the end plates are axially outermost. The outer diameter of the cylindrical member and the diameter of the large end of the tapering member are equal.

Means are provided for securing one of the end portions to the rod and for releasably securing the other of the end portions so that relative axial and angular movement may take place between the two end portions.

Figure 2:
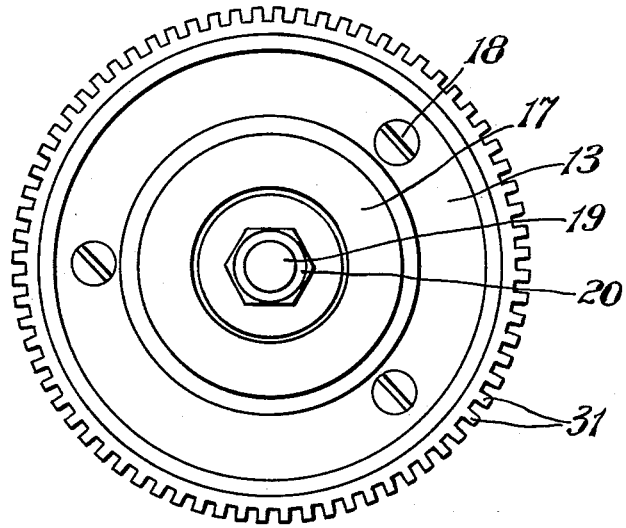
Figure 3:
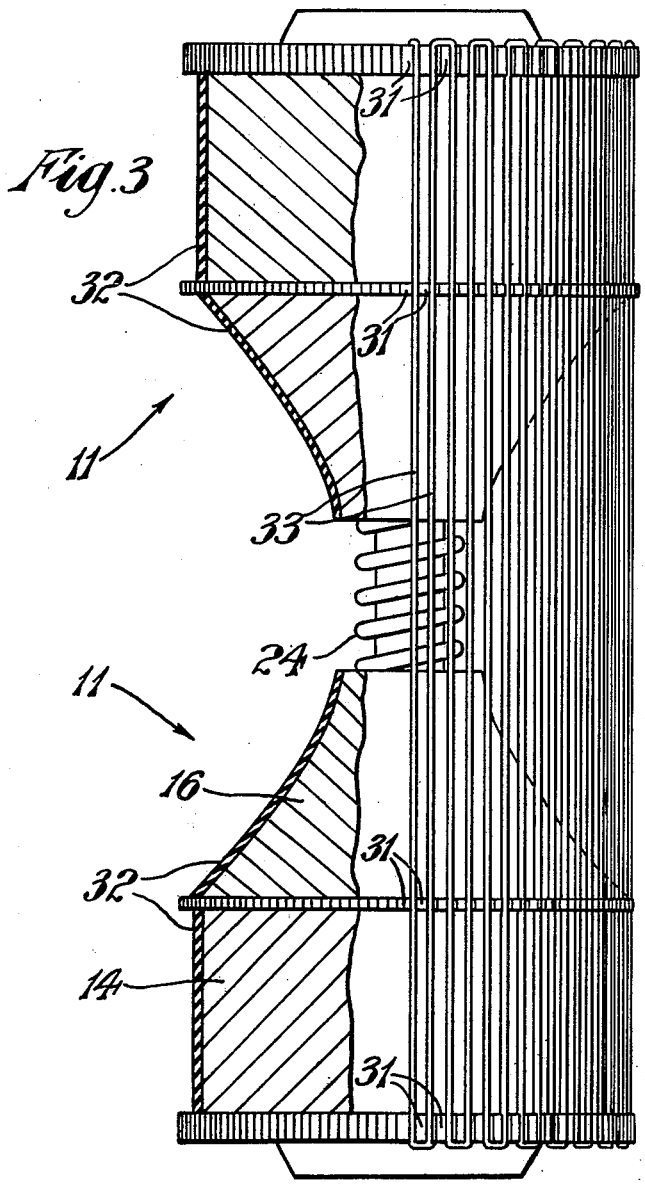
Figure 4:
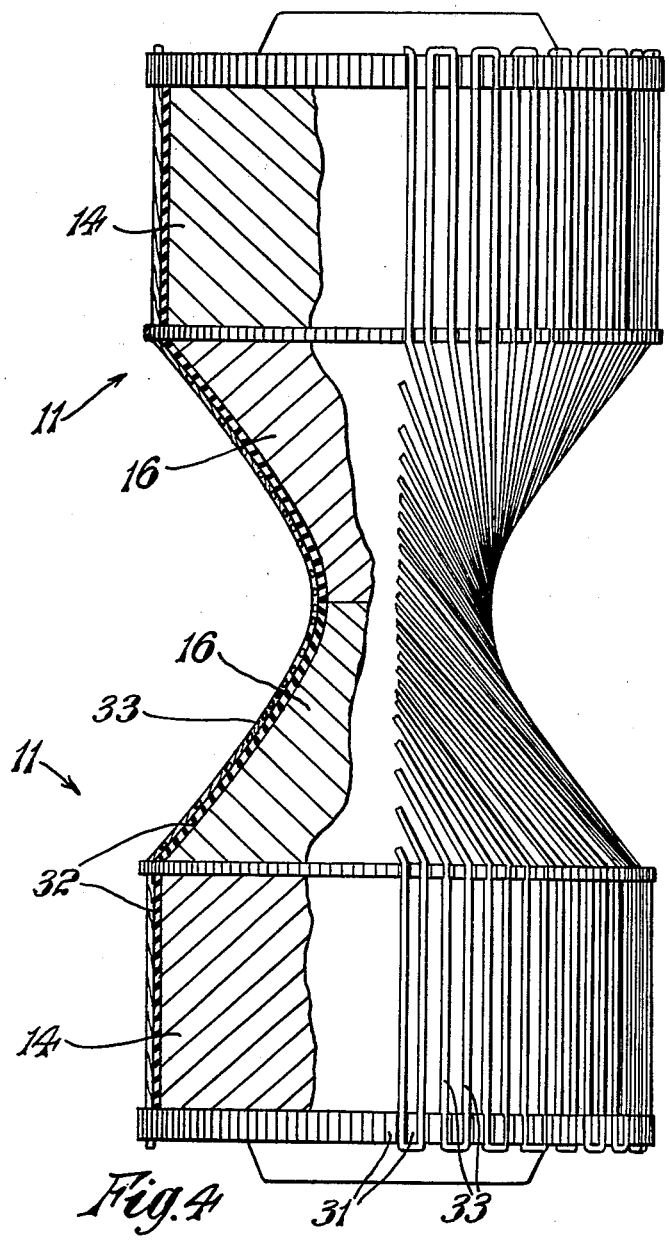
Figure 5:
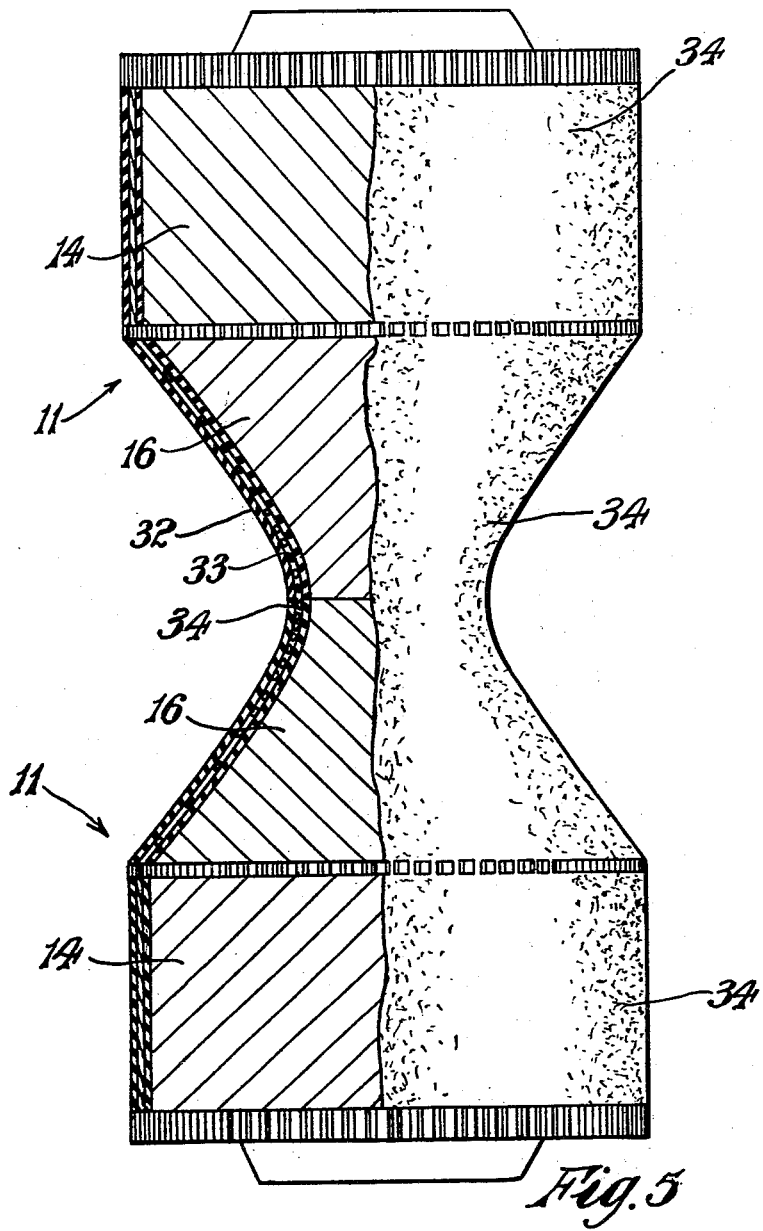

The preferred method of and apparatus for building a resilient diaphragm according to the invention will now be described with reference to the accompanying drawings of which:

FIGURE 1 shows a cross-section of a forming spool.
FIGURE 2 is an end view of the forming spool.
FIGURES 3, 4 and 5 show part sections on the building spool at various stages of construction of the diaphragm, and
FIGURES 6 and 7 show the diaphragm on formers.

Figure 7:
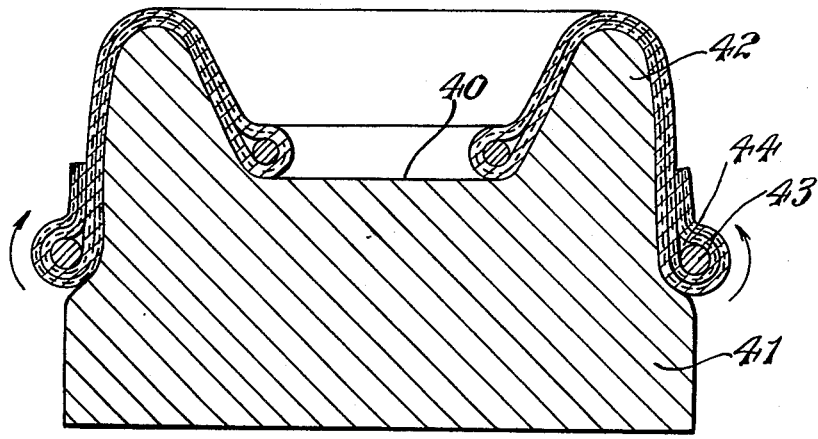
Figure 6:
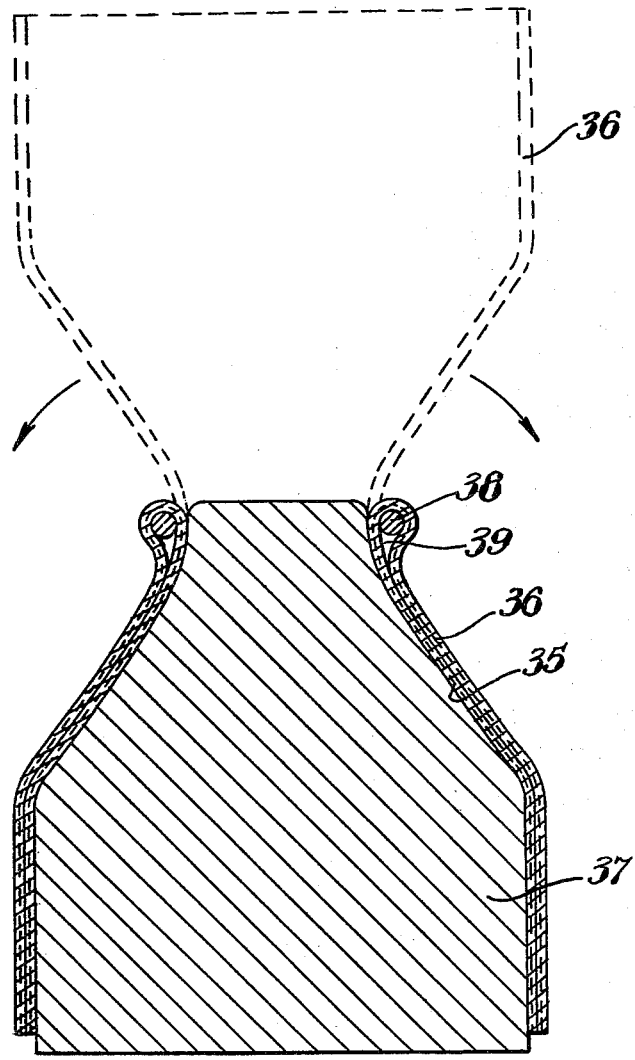

The apparatus for building a diaphragm according to the invention comprises a forming spool, illustrated in FIGURE 1, and building formers shown in FIGURES 6 and 7.

Referring to FIGURE 1 a forming spool 10 comprises two end portions 11 mounted co-axially on a central rod 12 which passes through both.

Each end portion is made up of a circular end plate 13, a cylindrical member 14, a separator plate 15 and a tapering member 16 which is a solid of revolution having a substantially frusto-conical shape tapering towards the middle of the spool 10. All have holes formed axially centrally therethrough and the cylindrical member 14 has projections 17 at both ends which serve as spigots for plates 13 and 15 and the tapering members 16 to maintain the assembly of plates and members in co-axial relationship. Each assembly is held together by screws 18.

Both ends of the rod 12 are stepped to a reduced diameter 19 and the extreme ends are threaded to receive a nut 20.

One end portion 11 has a hole formed through its centre as two bores 21 and 22 respectively there being a step 23 between the bores, which occurs in the body of the cylindrical member 14. One reduced diameter end 19 of the rod 12 fits into the bore 22 and the nut 20 draws the stepped portion on the rod 12 into abutment with the step 23 in the hole. A small recess 45 adjacent the step 23 is adapted to receive a peg 46 secured to the rod 12 to prevent the end portion 17 and rod 12 from rotating relative to each other. A helically coiled spring 24 encircles the rod 12 and fits within the bore 21 and abuts the step 23.

The second end portion 11 is also provided with a hole formed of two bores 25 and 26 respectively. The rod 12 is adapted to pass freely through the bore 25 which is formed in the tapering member 16 and the reduced diameter 19 at this end of the rod carries a locking mechanism which is adapted to frictionally engage the surface of the bore 26. The locking mechanism comprises a metal washer 27 in abutment with the step on the rod 12, a rubber friction member 28 having a cylindrical outer periphery and a conical inner periphery encircling the reduced diameter portion 19 of the rod, a metal locking member 29 having a conical outer periphery of the same taper as the conical surface of the friction member 28 and a hole formed therein, through which the portion 19 of the rod 12 passes, and a nut 20. The conical surfaces of the rubber friction member 28 and the locking member 29 are adapted to co-act to force the rubber member into frictional engagement with the surface of the bore 26 on tightening the nut 20. The helical spring 24 encircling the rod 12 abuts the second end portion in a small recess 30 formed at the inward end of the latter.

The end plates 13 and a separator plate 15 have equal numbers of projections 31 (FIGURE 2) formed at equal intervals on their outer peripheries. The end plate 13 and separator plate 15 are positioned on assembly so that the projections on the two are in axial alignment.

Referring now to FIGURE 3, a method of making a diaphragm comprises applying a ply of uncured rubber 32 to the surfaces of the cylindrical member 14 and tapering member 6 of both end portions 11 and subsequently winding a cord 33 to textile material alternately over the projections 31 on the end plates and between the projections 31 on the separator plates 15, the latter acting as guides. The cord may be of any suitable material such as cotton, rayon or polyethylene terephthalate. A sock of cords is formed by the winding and the end portions 11 are locked in axially spaced relationship during the winding. The locking is effected by rotating the nut 20 at the locking mechanism and by this means driving the metal locking member 29 into the friction member 28 and forcing the latter against the surface of the bore 26.

After winding, the appropriate end portion 11 is unlocked by unscrewing the locking nut 20 and the end portions 11 are twisted axially relative to each other. Such a twisting sets up a tension in the cords 33 which draws the end portions 11 together against the pressure of the spring 23 until the ends of the tapering members 11 meet. The end portions 11 are then locked in this position.

Enough twist is given to the end portions 11 to bed the cords 33 firmly into the ply 32 of rubber. This stage of the construction is shown in FIGURE 4. The shape of the tapering member 16 is such that the cords will bed down on to it.

A further ply 34 (FIGURE 5) of rubber is applied to the outer surface of the sock on the cylindrical member 14 and tapering member 16 respectively. The plies are then rolled so that the cords are bedded into the rubber and entrapped air is removed. The plies of rubber 32 and 34 are put on in sheet form and are in the uncured state.

After rolling, the cords 33 at the outer edges of the projections 31 are either unhooked or cut allowing the sock of cords and its plies to be peeled off the spool 10.

One half 35 of the sock is fitted over a first building former 37 (FIGURE 6). FIGURE 6 shows how the upper unsupported part 36 of the sock, shown in dotted lines, is drawn over a bead wire 38 positioned at the neck of the sock. Filler strips of rubber are inserted to fill the triangular space 39. The halves 35 and 36 of the sock are then rolled to consolidate them together and to remove entrapped air.

The two halves are removed from the first member 37, are inverted and fitted in a cavity 40 in a second building former 41 (FIGURE 7). The upward ends of the two halves of the sock are then drawn downwards over an annular ridge 42 on the former 41 and a large bead wire 43 is positioned to encircle them. The free ends are then folded back over the bead wire 43 and are rolled once again. The triangular space 44 is filled by applying a suitable filler strip of rubber.

The halves of the sock together with the bead wires now form an uncured diaphragm and this is removed from the former 41 and is placed in a suitable shaped mould and is cured by the application of heat in the known manner.

Several variations in the method of building the diaphragm may be made. One variation is the winding of the cords over the end portion of the spool so that they lie slantwise and generate an hourglass shape without the need for further twisting. Another variation is the imparting of a slight twist to the cylindrical parts at the end of the sock to give a further strengthening of the cord lattice structure adjacent the larger diameter end of the finished diaphragm.

Yet another variation lies in the doubling or multiplying of the number of cords forming the sock. They may be doubled up so that at the small diameter of the finished diaphragm the cords may lie as close as required or may even lie on top of one another, thus allowing the cords to be as close as desired at the outer periphery.

Yet another alternative in the method of manufacture is to dip the spool with cords attached into latex. This can be done by dipping the whole spool into latex with one end downwards, allowing to dry to a certain extent, reversing the spool, and dipping with the other end downwards. This procedure is taken so that a uniform coating of latex can be applied to the sock, the latex having a tendency to run downwards after dipping and thus to form a thicker coat on the lower portion of the sock. The reversal of the dipping enables the coat to be thickened at the previous top end.

The diaphragm, formed by the method described has the advantage that it is initially shaped so that no large deformation in a direction tending to separate the cords is required. A further advantage is that no wefts are used in the construction, since the diaphragm is not made from "weak weft" fabric. This means that there are no wefts to break when the diaphragm is shaped or moulded to its final form. Breakages of the weft filaments cause minute pinholes to appear in the body of the diaphragm and will eventually shorten the life of the diaphragm.

A further advantage of this type of diaphragm over known types is that the turn-back of the sock to form the second ply reinforces the "working" portion of the diaphragm while completely encircling the smaller bead wire. Conventional diaphragms usually have short turnbacks on both bead wires. With these there is a risk that the smaller diameter bead wire will be torn out of the diaphragm due to failure of its turn-back.

With conventional diaphragms the angle at which the cords cross each other may vary sometimes from as little as 30° adjacent the inner periphery to as much as 120° adjacent the outer periphery. Such a variation does not make for uniform strength along a radius of the diaphragm. In the present diaphragm the cords all lie on a substantial constant angle anywhere on the diaphragm.

Detail modifications of winding, ply application and to the apparatus used may be made without departing from the spirit of the invention.

Having now described my invention, what I claim is:

1. A method of manufacturing a rolling lobe diaphragm which comprises winding a cord of textile material alternately from a peripheral, circular, edge of one of two axially spaced end portions of a forming spool to a peripheral circular, edge of the other end portion to form a substantially cylindrical enclosure of parallel cord lengths between said end peripheries, twisting said end portions relatively to each other about their common axis while moving said circular peripheries toward each other during said twisting to draw said cord lengths between said circular peripheries in side-by-side position to an intermediate portion of reduced diameter spaced from said circular peripheries, embedding said cords in a flexible sheet of elastomer to form an impervious enclosure and to maintain said cord structure assembly on removal of said structure from said forming spool, mounting a bead ring on said intermediate portion midway between said end peripheries and folding the resulting structure on one side of said bead ring about said bead ring onto the structure on the opposite side of said bead ring.

2. The method of claim 1 in which said cord lengths between said circular peripheries are supported by complementary frusto-conical surfaces during said twisting of said end portions and drawing of said cord lengths to said intermediate portions.

3. The method of claim 2 in which said cords are embedded in said flexible elastomeric sheet by applying at least one ply of elastomeric sheet to at least one side of said structure and finally molding and setting said elastomeric material.

4. The method of claim 3 in which said ply of elastomeric material is mounted on said frusto-conical extensions and in which said cord lengths are drawn into and embedded in said ply of elastomeric material.

5. The method of claim 1 in which said cords comprise filamentary synthetic material.

6. The method of claim 1 in which said cords are embedded in said flexible elastomeric sheet by coating said cord assembly with a dispersion of an elastomer and drying said dispersion.

7. The method of claim 1 in which said elastomeric material comprises uncured natural rubber.

8. The method of claim 7 in which a bead is mounted on the larger end portions of said assembly of cords and elastomeric material and said end portions are turned over said cord mounted on said larger end portions of said assembly.

9. The method of claim 8 in which said assembly of cords and elastomeric material is vulcanized to cure said elastomeric material.

10. The method of claim 3 in which a sheet of flexible elastomeric material is mounted on the outer surface of said cord structure prior to applying said bead ring.

11. A method of manufacturing a rolling lobe diaphragm which comprises placing a continuous reinforcing cord under tension in successive lengths extending alternately in reversed directions between successive points on one of a pair of spaced parallel circles having a common axis normal to the planes of said circles to successive points on the other of said circles said points on said first and second circles between which said lengths are placed being displaced through an angle to place said lengths in substantially frusto-conical surfaces tapering to an intermediate portion of reduced diameter between said circles, applying an elastomer to said structure to form a continuous sheet embedding said cords, placing an annular bead about the intermediate portion of said assembly of cords and elastomer sheet and doubling the reinforced structure on one side of said neck portion onto the structure on the opposite side of said neck portion.

12. The method of claim 11 in which said elastomer is applied by dipping said cord structure into a dispersion of said elastomer to form a continuous sheet of said elastomer.

13. Apparatus for manufacturing a rolling lobe diaphragm which comprises a shaft, a pair of forming elements slidably mounted on said shaft, at least one of said forming elements being rotatable on said shaft, relative to the other forming element, each said forming element having a cylindrical surface co-axial with said shaft and having two axially spaced series of circumferentially spaced projections forming cord-receiving and guiding notches, resilient means separating said forming elements and deformable to permit said forming elements to move toward each other, and means to lock said forming elements to said shaft.

14. The apparatus of claim 13 in which each of said forming elements has a frusto-conical surface tapering from said cylindrical surface toward the other forming element.

15. The apparatus of claim 14 in which each forming element has an annular recess from the end opposed to the other element and in which said resilient means is a helical spring encircling said shaft and mounted at its ends in said recesses.

References Cited by the Examiner

UNITED STATES PATENTS

| 2,873,109 | 2/59 | Hartenstein et al. | 267—10 |
| 2,980,571 | 4/61 | Mosshart et al. | 154—81 |

EARL M. BERGERT, *Primary Examiner.*

CARL F. KRAFFT, *Examiner.*